United States Patent
Himmelmann

(10) Patent No.: US 8,193,783 B2
(45) Date of Patent: Jun. 5, 2012

(54) PERMANENT MAGNET GENERATOR HAVING PASSIVE FLUX CONTROL

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 450 days.

(21) Appl. No.: 12/568,734

(22) Filed: Sep. 29, 2009

(65) Prior Publication Data

US 2011/0074366 A1 Mar. 31, 2011

(51) Int. Cl.
*H02P 9/14* (2006.01)
*H02P 9/00* (2006.01)
*H02K 1/00* (2006.01)

(52) U.S. Cl. .......................... 322/46; 322/45; 310/181

(58) Field of Classification Search ................ 322/45, 322/46; 310/181
See application file for complete search history.

(56) References Cited

U.S. PATENT DOCUMENTS

| | | | |
|---|---|---|---|
| 4,656,379 A | 4/1987 | McCarty | 310/181 |
| 5,714,823 A | 2/1998 | Shervington et al. | 310/184 |
| 5,825,113 A | 10/1998 | Lipo et al. | 310/181 |
| 6,057,622 A | 5/2000 | Hsu | 310/191 |
| 7,233,129 B2 * | 6/2007 | Erdman et al. | 322/17 |
| 7,372,174 B2 | 5/2008 | Jones et al. | 290/44 |
| 7,400,117 B1 | 7/2008 | Rozman et al. | 322/45 |
| 7,501,799 B2 | 3/2009 | Rozman et al. | 322/46 |
| 7,521,906 B2 | 4/2009 | Rozman et al. | 322/45 |
| 7,554,303 B1 | 6/2009 | Kawamura | 322/46 |
| 2009/0009146 A1 * | 1/2009 | Rozman et al. | 322/27 |
| 2009/0295314 A1 * | 12/2009 | Ganev et al. | 318/376 |
| 2010/0301793 A1 * | 12/2010 | Jahkonen et al. | 318/503 |
| 2012/0007425 A1 * | 1/2012 | Rozman et al. | 307/25 |

* cited by examiner

*Primary Examiner* — Pedro J Cuevas
(74) *Attorney, Agent, or Firm* — Carlson Gaskey & Olds P.C.

(57) ABSTRACT

A permanent magnet generator assembly has a permanent magnet generator with magnetic flux control windings, a passive rectifier, and a passive control element. The passive control element electrically connects an output of the passive rectifier to the magnetic flux control windings.

12 Claims, 1 Drawing Sheet

PERMANENT MAGNET GENERATOR HAVING PASSIVE FLUX CONTROL

BACKGROUND

The present disclosure is directed towards a control system for a permanent magnet generator, and more specifically to a passive magnetic flux control for a permanent magnet generator.

Permanent magnet (PM) generators are commonly used to convert rotational movement into electrical power in many areas of vehicle design. If the rotation of a rotor is increased or the power drawn from the connected electronics (the load) is decreased, the generator will increase voltage output, and vice versa. The rotor speed of a PM generator varies with the speed of the mechanical driving component. The speed variation thereby results in variation of the PM generator output voltage.

It is often desirable to have a steady output voltage from a PM generator to provide power to vehicle systems. To maintain a steady output voltage, PM generator assemblies have incorporated active magnetic flux control systems, such as the control system described in U.S. Pat. No. 5,714,823 to Shervington. The Shervington system utilizes a set of control windings alongside the generator windings within the generator that are connected to an active magnetic flux controller. The active magnetic flux controller uses a processor and a detected rotor speed or output voltage and actively determines a control current required to achieve a desirable output voltage. The active controller then outputs the control current to the control windings and thereby controls the resulting output voltage.

When a current travels through the control windings, a magnetic flux is created which permeates the adjacent generator windings. The flux permeation magnetically decouples the generator windings from the rotor. The magnitude of the decoupling depends on the magnitude of current which travels through the control windings, and affects the output voltage of the PM generator. As the magnitude of the decoupling increases, the output voltage of the PM generator decreases. This allows the active controller to input an appropriate current to generate a desired output voltage based on the speed of rotation of the rotor.

While active controllers, such as the one described in Shervington, are generally precise and efficient, they are also expensive to create and calibrate.

SUMMARY

A permanent magnet generator assembly includes a PM generator with magnetic flux control windings. The PM generator is connected to a passive rectifier. The passive rectifier is connected to a passive control element, which is connected to the magnetic flux control windings.

A permanent magnet generator controller includes a DC rectifier and a passive control element.

A method for controlling a PM generator includes a step where a portion of the output voltage is converted into a current and the current is used to create a magnetic flux within the permanent generator.

These and other features of the present invention can be best understood from the following specification and drawings, the following of which is a brief description.

DETAILED DESCRIPTION OF THE EMBODIMENT

Figure 1:
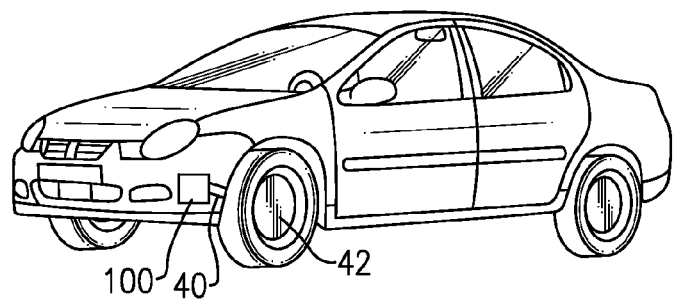
FIG. 1 illustrates a car using a permanent magnet generator with flux control.

FIG. 1 illustrates a vehicle, in this case a consumer automobile, which has a power generation system 100 with passive flux control mechanically connected to an axle 40 of a wheel 42. The power generation system 100 converts rotational movement of the axle 40 into power, which can be used to power electronics, or be stored in a battery for later use.

Figure 2:
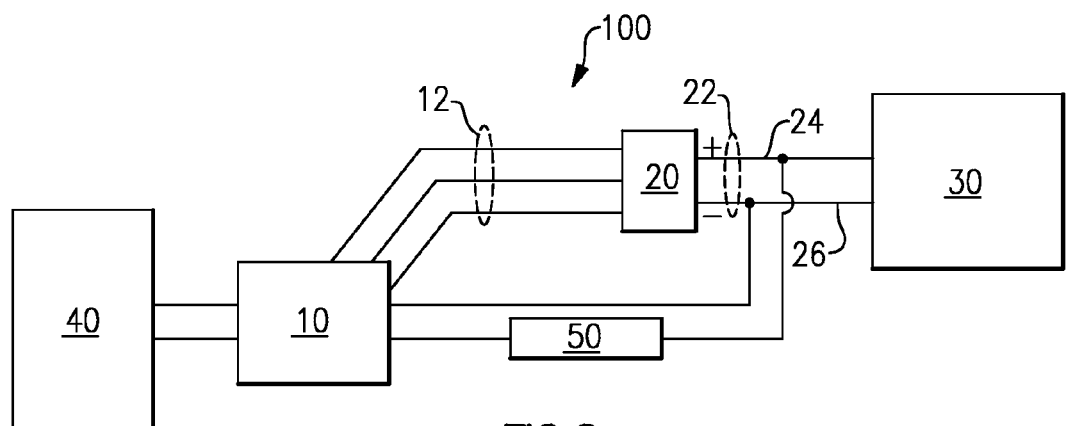
FIG. 2 schematically illustrates a permanent magnet generator assembly having a passive controller.

FIG. 2 illustrates power generation system 100 which includes a passive voltage control system for a PM generator 10 and can be used in the example of FIG. 1. The passive voltage control system can passively control the output voltage of the PM generator 10. The PM generator 10 includes a three phase electrical output 12 which is connected to a rectifier 20. The rectifier 20 has a DC output 22 which provides DC power to a load 30. The DC output 22 is also connected to the PM generator 10 and a passive control element 50. The illustration of FIG. 2 depicts the passive control element 50 as being connected to a positive DC output line 24 of the rectifier 20, however it could instead be connected to a negative DC output line 26 of the rectifier 20 and achieve the same functionality. The PM generator 10 is mechanically connected to an axle 40 which provides rotation for the PM generator's rotor. The axle 40 in FIG. 2 could be replaced by any prime mover and achieve the same result.

The output voltage of the PM generator 10 may be controlled in a known manner using control windings and magnetic flux decoupling. The examples herein utilize a passive control element 50 instead of an active control element as in some prior designs. The passive control system illustrated in FIG. 2 operates by siphoning a portion of the output power of the PM generator 10 through a passive control element 50 and into the control windings of the PM generator 10. The siphoning creates a feedback loop, where, as the speed of the rotor increases (or the power drawn by the load 30 decreases), the output voltage of the PM generator 10 increases. The increase in voltage output 12 of the PM generator 50 causes an increase in the DC output voltage 22 of the rectifier 20, which causes an increase in the current through the passive control element 50. The increase in current through the passive control element 50 is passed to the control windings, and causes the magnitude of magnetic coupling in the control windings to decrease. When the magnetic coupling decreases, the output voltage of the PM generator 50 will see a corresponding decrease. The feedback path additionally ensures that the opposite condition, where a decrease in output voltage 12 of the PM generator 10 (or an increase in the power drawn by the load 30) will result in an increase in magnetic coupling and an increase in the output voltage 12 of the PM generator 10 occurs as well.

The feedback described above occurs whenever the output voltage 22 of the rectifier 20 is not at the desired level, and will result in the PM generator 10 reaching a stable output voltage 12 regardless of the rotor speed. The value at which the output voltage 22 of the generation system 100 achieves a steady state is dependent on the construction of the passive control element 50, and could be modified or adjusted by modifying the passive control element 50.

An example of the passive control element 50 is a fixed resistor. The fixed resistor dissipates voltage along the feedback path and causes a current to flow. The magnitude of the current depends on the resistance value of the fixed resistor and the output voltage 22 of the generation system 100. The current (i) in the system is equal to the voltage drop (V) divided by the resistance (r) according to the following equation: $i=V/r$. The current created by the fixed resistor 50 travels through the control windings and causes the magnetic decoupling described above.

Using known principles, a value can be determined for the resistance of the passive control element which will generate the appropriate current needed to achieve the desired stable output voltage 22 of the generation system 100. Alternatively other electrical components that can passively convert a voltage into a corresponding current, such as a variable resistor, could be used in place of the fixed resistor described above and achieve the same result.

Figure 3:
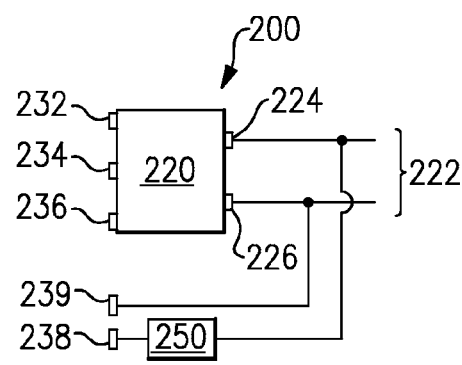
FIG. 3 schematically illustrates a voltage output control system for connection to a permanent magnet generator.

FIG. 3 schematically illustrates a passive control system 200 which can be connected to a PM generator with control windings. The passive control system 200 can replace an existing active control system in applications where high levels of precision and efficiency may not be required. The passive control system 200 includes a rectifier 220, and a passive control element 250. The rectifier 220 includes a set of power inputs, which could be three phase inputs 232, 234, 236 as is illustrated in FIG. 3, or alternatively, the power inputs could be a single phase input in the case of a single phase generator, a positive DC output 224 and a negative DC output 226. The positive DC output 224 and the negative DC 226 output together form a DC output bus 222. The passive control element 250 is connected to a positive portion of the DC output bus 222 and has a connection 238 for connecting to the control windings of the PM generator. The other end of the control windings of the PM generator are connected to the negative portion of the DC output bus 222 via a connector 239. Once connected, the passive control system 200 functions as described above, with regards to FIG. 2, and controls the output voltage of the PM generator without the use of an expensive active controller. It is desirable to implement such a system in consumer and military vehicles, such as automobiles, where the costs associated with creating and calibrating the active generator flux controls would be cost prohibitive. A passive generator control system is cheaper to construct and calibrate, and is well suited to such applications.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A permanent magnet (PM) generator assembly comprising;
    a PM generator having magnetic flux control windings and a power output;
    a passive rectifier, having a rectifier output, connected to the power output of said PM generator;
    a passive control element electrically connected to the rectifier output of said passive rectifier and said magnetic flux control windings.

2. The PM generator assembly of claim 1 wherein said passive control element comprises a resistor.

3. The PM generator assembly of claim 2, wherein said resistor has a fixed resistance value.

4. The PM generator assembly of claim 2, wherein said resistor has a variable resistance value.

5. The PM generator assembly of claim 1, wherein said passive control element is operable to convert a PM generator output voltage into a flux control current.

6. A passive permanent magnet (PM) generator control system comprising a passive rectifier connected to a rectifier output bus and a passive control element connecting the rectifier output bus to a control winding within the PM generator.

7. The passive PM generator control system of claim 6, wherein said passive control element comprises a fixed resistor.

8. The passive PM generator control system of claim 7, wherein said resistor has a fixed resistance value.

9. The passive PM generator control system of claim 7, wherein said resistor has a variable resistance value.

10. The passive PM generator control system of claim 6, wherein said passive control element is operable to convert a PM generator output voltage into a flux control current.

11. A method for passively maintaining a permanent magnet (PM) generator output voltage comprising the steps of;
    converting a portion of a PM generator output voltage into a current; and
    generating a magnetic flux within said permanent magnet generator based on said current.

12. The method of claim 11, wherein said step of generating a magnetic flux within said permanent magnet generator comprises passing said current through a PM generator control winding.

* * * * *